US011076158B2

United States Patent
Bastani et al.

(10) Patent No.: US 11,076,158 B2
(45) Date of Patent: Jul. 27, 2021

(54) SYSTEMS AND METHODS FOR REDUCING WIFI LATENCY USING TRANSMIT OPPORTUNITY AND DURATION

(71) Applicant: Facebook Technologies, LLC, Menlo Park, CA (US)

(72) Inventors: Behnam Bastani, Palo Alto, CA (US); Xiaoguang Wang, Sunnyvale, CA (US); Gang Lu, Pleasanton, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/564,916

(22) Filed: Sep. 9, 2019

(65) Prior Publication Data

US 2021/0076046 A1    Mar. 11, 2021

(51) Int. Cl.
*H04N 11/02* (2006.01)
*H04N 19/146* (2014.01)
*H04N 19/174* (2014.01)
*H04L 29/08* (2006.01)
*H04L 29/06* (2006.01)

(52) U.S. Cl.
CPC ......... *H04N 19/146* (2014.11); *H04L 65/60* (2013.01); *H04L 65/80* (2013.01); *H04L 67/322* (2013.01); *H04N 19/174* (2014.11)

(58) Field of Classification Search
CPC .................................................. H04N 19/146
USPC ............................................ 375/240.01–29
See application file for complete search history.

(56) References Cited

U.S. PATENT DOCUMENTS

| 6,349,210 | B1* | 2/2002 | Li | H04L 12/1868 370/329 |
| 6,389,473 | B1* | 5/2002 | Carmel | H04L 29/06 709/231 |
| 6,791,994 | B1* | 9/2004 | Young | H04J 3/16 370/436 |
| 6,859,463 | B1* | 2/2005 | Mayor | H04W 52/241 370/252 |
| 10,460,700 | B1* | 10/2019 | Mendhekar | H04L 65/60 |
| 2003/0227934 | A1* | 12/2003 | White | H04L 45/16 370/432 |
| 2006/0072831 | A1* | 4/2006 | Pallister | H04N 21/8153 382/232 |
| 2006/0088094 | A1* | 4/2006 | Cieplinski | H04N 19/124 375/240.01 |
| 2006/0146928 | A1* | 7/2006 | Wang | H04N 19/172 375/240.03 |
| 2006/0256868 | A1* | 11/2006 | Westerman | H04N 19/17 375/240.24 |
| 2008/0253448 | A1* | 10/2008 | Lin | H04N 19/436 375/240.03 |

(Continued)

*Primary Examiner* — Leron Beck
(74) *Attorney, Agent, or Firm* — Foley & Lardner LLP (57) ABSTRACT

Disclosed herein includes a system, a method, and a device for reducing latency and jitter by reserving a transmission duration for a transmit opportunity. A device can compress a first slice of a plurality of slices of a video frame to obtain a size of the first slice after compression. The device can estimate a size of the video frame after compression, according to the size of the first slice after compression. The device can generate a request to send (RTS) to reserve, a transmission channel for a transmission duration corresponding to the size of the video frame after compression. The device can broadcast the RTS to one or more other devices.

20 Claims, 5 Drawing Sheets

(56) References Cited

U.S. PATENT DOCUMENTS

| | | | |
|---|---|---|---|
| 2009/0041050 A1* | 2/2009 | Hunzinger | H04W 28/18 370/447 |
| 2011/0317762 A1* | 12/2011 | Sankaran | H04N 19/152 375/240.13 |
| 2012/0127937 A1* | 5/2012 | Singh | H04W 12/003 370/329 |
| 2012/0243602 A1* | 9/2012 | Rajamani | H04N 21/4126 375/240.02 |
| 2012/0281768 A1* | 11/2012 | Matsuba | H04N 19/91 375/240.24 |
| 2012/0311068 A1* | 12/2012 | Gladwin | H04L 67/1097 709/214 |
| 2013/0013761 A1* | 1/2013 | Grube | H04L 65/4084 709/223 |
| 2013/0128949 A1* | 5/2013 | Sezer | H04N 19/50 375/240.02 |
| 2013/0202025 A1* | 8/2013 | Baron | H04L 65/80 375/240.02 |
| 2013/0208708 A1* | 8/2013 | Nezou | H04W 72/0446 370/336 |
| 2013/0301523 A1* | 11/2013 | Asterjadhi | H04W 72/0406 370/328 |
| 2015/0304872 A1* | 10/2015 | Sadek | H04W 24/10 370/252 |
| 2016/0301894 A1* | 10/2016 | Bhat | H04N 19/174 |
| 2016/0373324 A1* | 12/2016 | Gholmieh | H04L 41/50 |
| 2017/0011557 A1* | 1/2017 | Lee | G06F 3/04842 |
| 2017/0227765 A1* | 8/2017 | Mammou | H04L 65/60 |
| 2017/0244951 A1* | 8/2017 | Ha | H04N 13/194 |
| 2019/0037462 A1* | 1/2019 | Chowdhury | H04W 36/0005 |
| 2019/0178980 A1* | 6/2019 | Zhang | A61B 5/02 |
| 2019/0297500 A1* | 9/2019 | Rios, III | H04L 9/3226 |
| 2019/0335189 A1* | 10/2019 | Abdelkhalek | H04N 21/23406 |
| 2020/0221392 A1* | 7/2020 | Xue | H04W 16/14 |

* cited by examiner

SYSTEMS AND METHODS FOR REDUCING WIFI LATENCY USING TRANSMIT OPPORTUNITY AND DURATION

FIELD OF DISCLOSURE

The present disclosure is generally related to display systems and methods, including but not limited to systems and methods for reducing WiFi latency using transmission duration for a transmit opportunity.

BACKGROUND

In video streaming technologies, latency and jitter can impact a user experience. For example, latency and jitter issues in a connection between a transmitting and receiving device can result in a delay of a video stream to the receiving device or a delay in individual portions of the video stream being received at the receiving device. Thus, the reduction of latency and jitter can be critical to improving video quality and user experience at the receiving device or end device.

SUMMARY

Devices, systems and methods for reducing latency and/or jitter by reserving a transmission duration for a transmit opportunity are provided herein. A device (e.g., WiFi device) can include a virtual reality (VR) application, a device driver (e.g., WiFi driver), and/or firmware (e.g., MAC FW), and the device can be dedicated to video streaming (e.g., VR streaming and/or provisioning). For example, the VR application, device driver and/or firmware can communicate to process a video stream for streaming to at least one end device, and can reduce a latency and/or jitter of the respective video stream during a transmit opportunity. A transmit opportunity can include or refer to a time period, time range or amount of time a transmitting device can transmit one or more frames to a receiving device after the receiving device has been given or provided contention (e.g., contention period, transmitting period) for a transmission medium (e.g., wireless medium) between the transmitting device and the receiving device. The VR application can generate an indication of a start and/or an end of a transfer of a video frame, and can provide the indication(s) to the device driver with a plurality of slices of the respective video frame. The device driver can estimate a transmission duration to transmit data units corresponding to the plurality of slices of the video frame to an end device and request a transmit opportunity having the estimated transmission duration. The firmware can generate a request to send (RTS) for the end device, requesting a transmit opportunity for the estimated transmission duration. The firmware can reserve the transmission channel for the estimated transmission duration to avoid more than one (medi) access contention and backoff process from occurring. Thus, the systems and methods described herein can provide a tradeoff between channel utilization efficiency and a reduced maximum latency spike. For example, the device can use the estimated transmission duration to transmit all of the data units corresponding to the plurality of slices of the video frame in a single transmit opportunity. The number of transmit opportunities to deliver the video frame can reduced (e.g., single transmit opportunity) and reduce latency spikes that can occur during multiple transmit opportunities.

In at least one aspect, a method is provided. The method can include compressing, by a device, a first slice of a plurality of slices of a video frame to obtain a size of the first slice after compression. The method can include estimating, by the device, a size of the video frame after compression, according to the size of the first slice after compression. The method can include generating, by the device, a request to send (RTS) to reserve, a transmission channel for a transmission duration corresponding to the size of the video frame after compression. The method can include broadcasting, by the device, the RTS to one or more other devices.

In some embodiments, the method can include transmitting, by a virtual reality application of the device, frame information to a device driver of the device, the frame information comprising the estimated size of the video frame after compression. The method can include estimating, by the device driver, the transmission duration according to the frame information and generating, by the device driver according to the frame information, an instruction to cause a firmware of the device to generate the RTS. The method can include transmitting, by a virtual reality application of the device, the plurality of slices of the video frame to a device driver of the device. The method can include processing, by the device driver, the plurality of slices of the video frame into a plurality of packets. The method can include transmitting, by the device driver, the plurality of packets to a firmware of the device.

In some embodiments, the method can include aggregating, by a firmware of the device, a plurality of packets corresponding to the plurality of slices into a determined number of protocol data units for transmission to a receiving device via the transmission channel. The method can include determining, by the device, that a transmission for the video frame to a receiving device is complete prior to an end of the transmission duration. The method can include transmitting, by the device in response to the determining, a control frame to the receiving device to release the transmission channel prior to the end of the transmission duration.

In at least one aspect, a device is provided. The device can include one or more processors. The one or more processors can be configured to compress a first slice of a plurality of slices of a video frame to obtain a size of the first slice after compression. The one or more processors can be configured to estimate a size of the video frame after compression, according to the size of the first slice after compression. The one or more processors can be configured to generate a request to send (RTS) to reserve a transmission channel for a transmission duration corresponding to the size of the video frame after compression. The one or more processors can be configured to broadcast the RTS to one or more other devices.

In some embodiments, the device can include a virtual reality application, a device driver and a firmware. In some embodiments, a virtual reality application can be executing on the one or more processors. The virtual reality application can be configured to transmit frame information to a device driver, the frame information comprising the estimated size of the video frame after compression. The device driver can be configured to estimate the transmission duration according to the frame information and generate an instruction to cause a firmware of the device to generate the RTS. The device driver can be executing on the one or more processors. The device driver can be configured to process the plurality of slices of the video frame into a plurality of packets. The device driver can be further configured to transmit the plurality of packets to a firmware of the device.

In some embodiments, a firmware can be executing on the one or more processors. The firmware can be configured to aggregate a plurality of packets corresponding to the plurality of slices into a determined number of protocol data units for transmission to a receiving device via the transmission channel. The one or more processors can be further configured to determine that a transmission for the video frame to a receiving device is complete prior to an end of the transmission duration. The one or more processors can be further configured to transmit a control frame to the receiving device to release the transmission channel prior to the end of the transmission duration, in response to the determination.

In at least one aspect, a non-transitory computer readable medium storing instructions is provided. The instructions when executed by one or more processors can cause the one or more processors to compress a first slice of a plurality of slices of a video frame to obtain a size of the first slice after compression. The instructions when executed by one or more processors can cause the one or more processors to estimate a size of the video frame after compression, according to the size of the first slice after compression. The instructions when executed by one or more processors can cause the one or more processors to generate a request to send (RTS) to reserve a transmission channel for a transmission duration corresponding to the size of the video frame after compression. The instructions when executed by one or more processors can cause the one or more processors to broadcast the RTS to one or more other devices.

In some embodiments, the instructions when executed by one or more processors can cause the one or more processors to determine that a transmission for the video frame to a receiving device is complete prior to an end of the transmission duration. The instructions when executed by one or more processors can cause the one or more processors to transmit a control frame to the receiving device to release the transmission channel prior to the end of the transmission duration, in response to the determination.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

A. Reducing Latency and/or Jitter by Reserving a Transmission Duration for a Transmit Opportunity Devices, systems and methods for reducing latency and/or jitter for streaming technologies, including but not limited to video streaming, are provided herein. In some embodiments, a device (e.g., WiFi device) can be dedicated to process and transmit video frames for delivery to an end device in, for example, a single transmit opportunity. The device can include or execute a virtual reality (VR) application, a device driver (e.g., WiFi driver) and/or firmware (e.g., media access control firmware) to perform different portions of the processing and transmitting of one or more video frames to an end device in a single transmit opportunity, by a reserving a transmission duration to transmit one or more data units corresponding to one or more slices of the video frame, to the end device in the single transmit opportunity.

In streaming technologies, latency and jitter can be critical to an end user's experience. In some embodiments, to reduce latency, a video frame can be compressed and partitioned into multiple slices. A transmitting device can transmit the slices to a receiving device and a decoder on the receiving device can begin processing the slices as the remaining slices of the video frame are being transmitted to the receiving device from the transmitting device. In such embodiments, the WiFi device can experience or see multiple bursts of data frames during one time frame. If the WiFi device does not recognize or understand the video traffic pattern, the WiFi device may request multiple transmit opportunities (TXOP) to deliver (the slices of) the video frame. Each of the transmit opportunities can include an enhanced distributed channel access (EDCA) contention process which can result in longer latency spikes and/or jitter issues, for example, when channel contention is high.

Devices, systems and methods described herein can reduce latency and/or jitter for streaming technologies, for example, by reserving a transmission channel for a transmission duration that is based in part on a total time to transfer data units of a video frame in a single transmit opportunity, each data unit corresponding to one or more slices of the video frame. In some embodiments, the subject matter of this disclosure is directed to a technique for reserving a transmission duration (e.g., for a transmit opportunity or TXOP) of a sufficient length to cover transmitting one or more data units associated with a full video frame by using request to send (RTS) signaling. A video frame can be partitioned into multiple slices or data units so that compression and processing time for each data unit is a fraction of that for the whole video frame, resulting in reduced latency due to compression and processing. However, in a multi-device wireless environment where channel contention for transmissions can be significant, contention and backoff processes can cause the transmissions between data units to be pushed further apart, hence contributing to latency. The present solution reserves a TXOP of a duration long enough for transmission of all data units associated with a video frame, which avoids the contention and backoff processes between data units.

In some embodiments, a Wi-Fi device (e.g., a VR puck, VR personal computer (PC) or head mounted display) includes a virtual reality (VR) application, a Wi-Fi driver and/or a media access control (MAC) firmware. The VR application (e.g., operating or residing on an application layer) can estimate an overall size of a video frame after compression, e.g., by compressing a first slice to obtain the compressed size of the first slice. The VR application can be configured with additional protocol to communicate a marker frame to the device driver that includes an indication of the estimated overall size of the video frame (or all slices) after compression. The Wi-Fi driver can use the estimated size to estimate a total transmit time for transmitting all slices of the video frame to a receiving MAC device, in view of modulation and control signaling (MCS) information obtained via the MAC firmware. Based on the estimated transmit time, the Wi-Fi driver can request a TXOP for the video frame to the MAC firmware, which generates and broadcasts a RTS with the requested TXOP, hence reserving a protected transmission duration for the data units associated with the video frame, free from contention and backoff processes.

During transmission, the VR application can send multiple slices of the video frame to the Wi-Fi driver, which processes (e.g., estimate transmission duration, request transmit opportunity, generate end frame) and transmits the slices as a plurality of packets to the MAC firmware. The MAC firmware in turn processes (e.g., transmit RTS, generate control frame, aggregate packets) and aggregates the packets into a number of PPDUs for transmission towards the receiving device. In some embodiments, during the protected transmission duration, the MAC firmware can determine if the transmission of the data units associated with the video frame completed earlier than expected, and can send a control frame to the receiving MAC device to release the TXOP ahead of the end time of the protected transmission duration. In some embodiments, using the estimated transmission duration, a latency for the transmission of the data units corresponding to the video frame can be reduced (e.g., by 50%, by more than 50%).

Figure 1A:
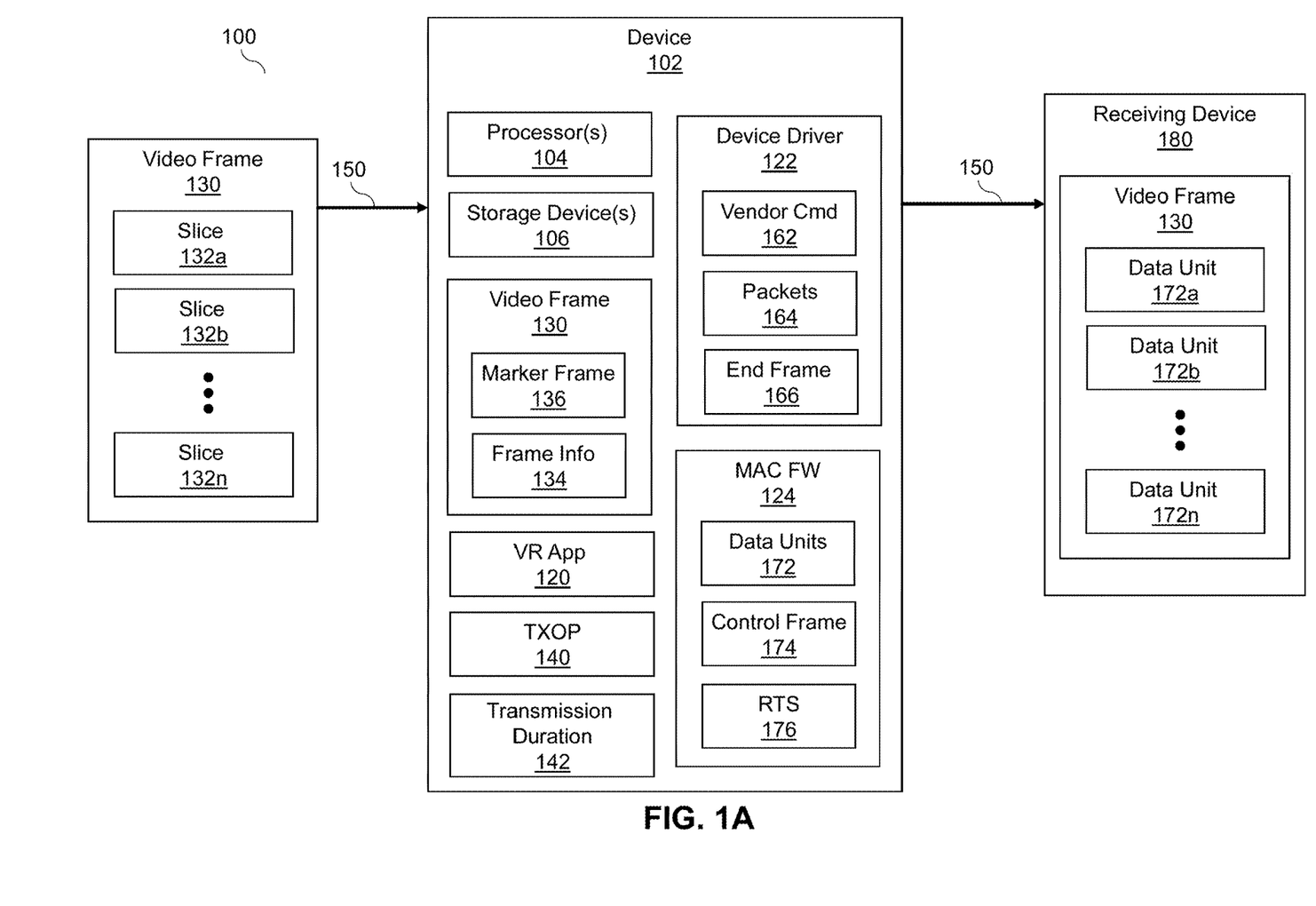
FIG. 1A is a block diagram of an embodiment of a system for reducing latency and/or jitter, according to an example implementation of the present disclosure.

Referring now to FIG. 1A, an example system 100 for reducing latency and/or jitter (e.g., time difference in packet inter-arrival time, irregular time delay in transmitting packets, latency of a packet flow between two devices) by reserving a transmission duration 142 of a sufficient length to cover transmission of one or more data units 172 associated with a full video frame 130 using request to send (RTS) 176 signaling is provided herein. In brief overview, the system 100 can include a device 102 having a virtual reality (VR) application 120 (as an example, which can be some other application in some embodiments), a device driver 122 and a firmware 124. The VR application 120, device driver 122 and firmware 124 can communicate with each to process the slices 132 of the video frame 130 and transmit data or content from slices 132 of a video frame 130 to at least one receiving device 180 through a transmission channel 150 reserved for an estimated transmission duration 142 of a transmission opportunity 140.

The device 102 can include a computing system or WiFi device. In some embodiments, the device 102 can be implemented, for example, as a wearable computing device (e.g., smart watch, smart eyeglasses, head mounted display), desktop computer, laptop computer, a VR puck, a VR PC, VR computing device or a head mounted device, or implemented with distributed computing devices. For example, the device 102 can be implemented to provide virtual reality (VR), augmented reality (AR), mixed reality (MR) content or experience. In some embodiments, the device 102 can include conventional, specialized or custom computer components such as processors 104, a storage device 106, a network interface, a user input device, and/or a user output device.

The device 102 can include one or more processors 104. The one or more processors 104 can include any logic, circuitry and/or processing component (e.g., a microprocessor) for pre-processing input data (e.g., video frame information 134) for any one or more of the device 102, VR application 120, device driver 122, or firmware 124, and/or for post-processing output data for any one or more of the device 102, VR application 120, device driver 122, or firmware 124. The one or more processors 104 can provide logic, circuitry, processing component and/or functionality for configuring, controlling and/or managing one or more operations of the device 102, VR application 120, device driver 122, or firmware 124. For instance, a processor 104 may receive data associated with a video frame 130 to estimate a compressed slice 132 size, estimate a transmission duration 142 and transmit slices 132 of a video frame 130 to a receiving device 180 in a transmit opportunity 140 having the estimated transmission duration 142.

The device 102 can include a storage device 110. A storage device 110 can be designed or implemented to store, hold or maintain any type or form of data associated with the first device 102, VR application 120, device driver 122, and firmware 124. For example, the data can include frame information 134 corresponding to one or more video frames 130 processed by the device 102. The data can include slice data, an estimated compressed size of one or more slices 132, or a marker frame 136. In some embodiments, the data can include one or more vendor commands 162, one or more packets 164, and one or more end frame commands 166 generated by the device driver 122. The data can include one or more protocol data units 172 (PLCP protocol data units (PPDUs), aggregated MAC protocol data units (AMPDUs)), one or more control frames 174, and one or more request to send (RTS) commands 176 generated by the firmware 124. The storage device 110 can include a memory (e.g., memory, memory unit, storage device, etc.). The memory may include one or more devices (e.g., random access memory (RAM), read-only memory (ROM), Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit and/or the processor) the one or more processes described herein.

The device 102 can include a VR application 120 in some embodiments. The VR application 120 can include or be implemented in hardware, or at least a combination of hardware and software. The VR application 120 can include a virtual reality, augmented reality or mixed reality application executing on the device 102. The VR application 120 can generate and insert a marker frame 136 before or prior to a first slice 132 of a video frame 130 is transmitted to the device driver 122. The marker frame 136 can include executable instructions, a command, a script, a function and/or tasks to indicate the transmission of one or more slices 132 of a video frame 130. The maker frame 136 can include frame information 134 corresponding to the video frame 130, including but not limited to an estimated compressed size of at least one slice 132 (e.g., compressed first slice 132) of the video frame 130. The frame information 134 can include any data or information corresponding to or associated with the video frame. In some embodiments, the frame information 134 can include, but not limited to, a compressed size of at least one slice 132 of the video frame 130, a number of slices 132 of the video frame 130, and/or a total size of the video frame 130.

The device 102 can include a device driver 122. The device driver 122 can include or be implemented in hardware, or at least a combination of hardware and software. The device driver 122 can include or be implemented as a network driver, wireless driver, or a WiFi driver for the device 102. In some embodiments, the device driver 122 can include software or a program to allow an operating system or processor(s) 104 of the device 102 to communicate with a wireless or network adapter of the device 102. The device driver 122 can be configured to estimate a transmission duration 142 for a transmission opportunity 140. In some embodiments, the device driver 122 can generate a vendor command 162 having the transmission duration 142. In some embodiments, the device driver 122 can translate or convert a marker frame 136 into a vendor command 162. The vendor command 162 can include executable instructions, a script, a function and/or tasks. In some embodiments, the vendor command 162 can include a vendor specific command generated by the device driver 122 to instruct or command the firmware 124 to request, establish or force an expected duration for the next RTS 176, and/or to request, establish or force a new protocol data unit 172 (e.g., AMDPU) to be started with the following packet 164 or responsive to receiving the next or subsequent packet 164. The device driver 122 can convert, format or process one or more slices 132 of a video frame 130 into one more packets 164. The packets 164 can include data packets or data units corresponding to at least one slice 132 of a video frame 130. For example, and in some embodiments, the device driver 122 can convert the slices 132 of a video frame 130 into a plurality of packets 164. In some embodiments, the device driver 122 can convert each slice 132 into at least one packet 164. In some embodiments, the device driver 122 can generate an end frame 166 to indicate an end of a video frame 130. The end frame 166 can include a marker, instruction, flag or indication of an end of a video frame 130. In some embodiments, the device driver 122 can generate and transmit the end frame (e.g., in one of the packets 164, or in a separate transmission) responsive to the last slice 132 or packet 165 corresponding to the last slice 132 of a video frame 130 being transmitted to the firmware 124.

The device 102 can include a firmware 124. The firmware 124 can include or be implemented in hardware, or at least a combination of hardware and software. In some embodiments, the firmware 124 can include a media access control (MAC) firmware (e.g., firmware operating or executing at a MAC layer of the OSI model). In some embodiments, the firmware 124 can include executable instructions that may be of any type including applications, programs, services, tasks, scripts, and/or libraries processes. The firmware 124 can be configured to receive one or more packets 164, and can generate one or more protocol data units 172. In some embodiments, the firmware 124 can generate at least one protocol data unit 172 for each packet 164. The firmware 124 can combine or aggregate the plurality of packets 164 to generate one or more protocol data units 172. For example, the protocol data units 172 can include an aggregated MAC protocol data unit. The firmware 124 can be configured to generate a control frame 174. The control frame 174 can for instance include, triggering information, executable instructions, a command, a script, a function and/or tasks to release or end a transmit opportunity 140. The control frame 174 can include a control frame (CF) end frame to indicate or instruct an end of a video frame 130 or transmission of one or more protocol data units 172 corresponding to the video frame 130. The firmware 124 can be configured to generate a RTS 176 to initiate a transmit opportunity 140. In some embodiments, the RTS 176 can include executable instructions, a command, a control frame, a script, a function and/or tasks to initiate, start or reserve a transmit opportunity 140. The RTS 176 can include an estimated transmission duration 142 indicating a time period, time range (e.g., minimum duration, maximum duration) or time length to reserve a transmission channel 150 for a transmit opportunity 140.

The device 102 can be communicatively coupled with the receiving device 180, for example, through one or more transmission channels 150 or connections 105. For example, the device 102 can transmit one or more protocol data units 172 (e.g., PLCP protocol data units (PPDUs)) during a transmit opportunity 140 to provide a video frame 130 to the receiving device 180 through one or more transmission channels 150. Transmission channel 150 can include a session or connection between the device 102 (e.g., VR application 120, device driver 122, firmware 124) to the receiving device 180. In some embodiments, the transmission channel 150 can include an encrypted and/or secure session or connection between the device 102 and the receiving device 180.

The receiving device 180 can include an end device, second device or an output device to provide a virtual reality (VR), augmented reality (AR), or mixed reality (MR) experience. The receiving device 180 can include a computing system, user input device or user output device. In some embodiments, the receiving device 180 can be implemented, for example, as a device (e.g., consumer device) such as a smartphone, other mobile phone, tablet computer, image projector, wearable computing device (e.g., smart watch, eyeglasses, head mounted display), desktop computer, laptop computer, or implemented with distributed computing devices. In some embodiments, the receiving device 180 can include conventional, specialized or custom computer components such as processors, a storage device, a network interface, a user input device, and user output device.

Figure 1B:
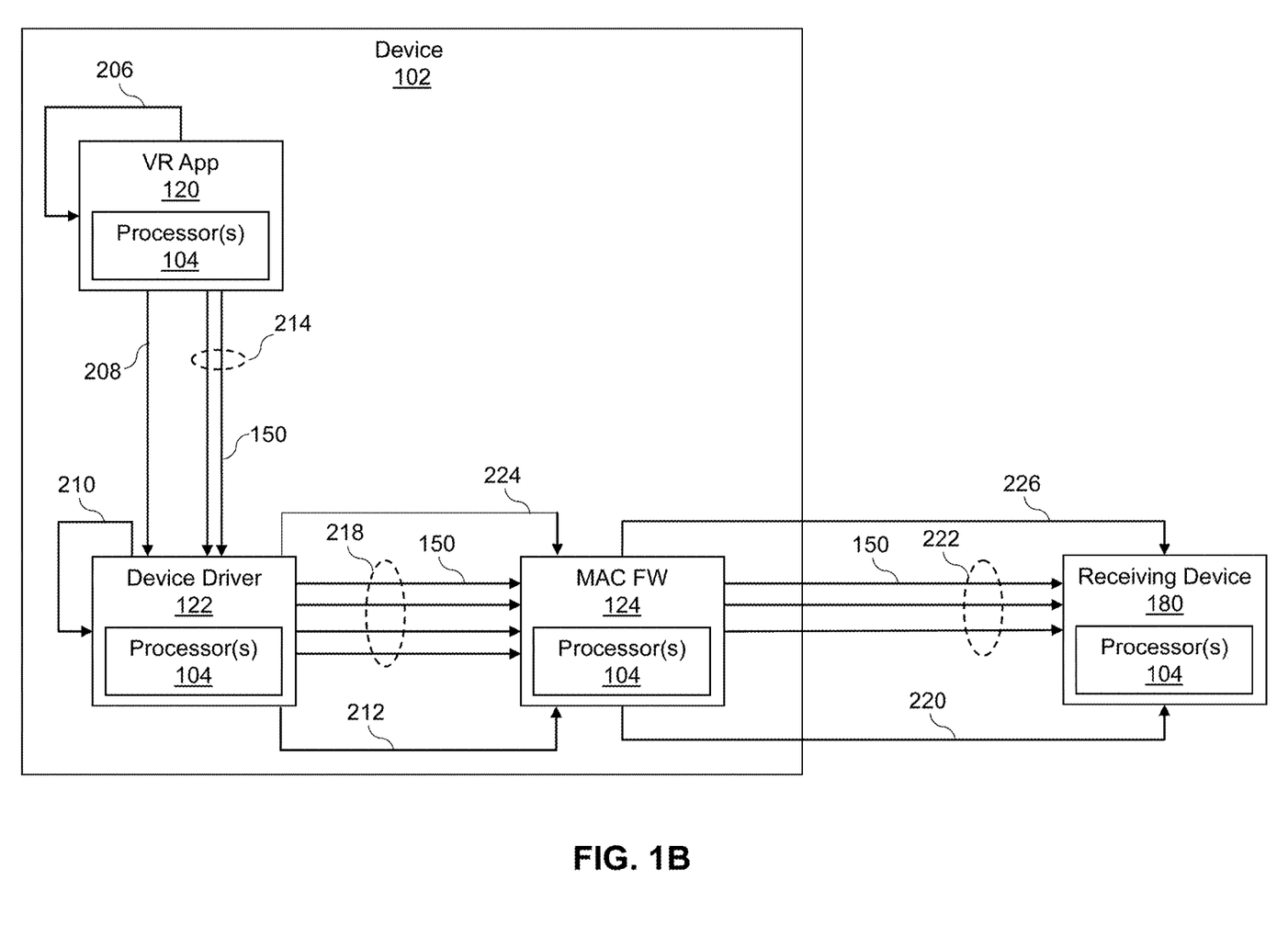
FIG. 1B is a block diagrams of an embodiment of components of a device for reducing latency and/or jitter, according to an example implementation of the present disclosure.
Figure 2A:
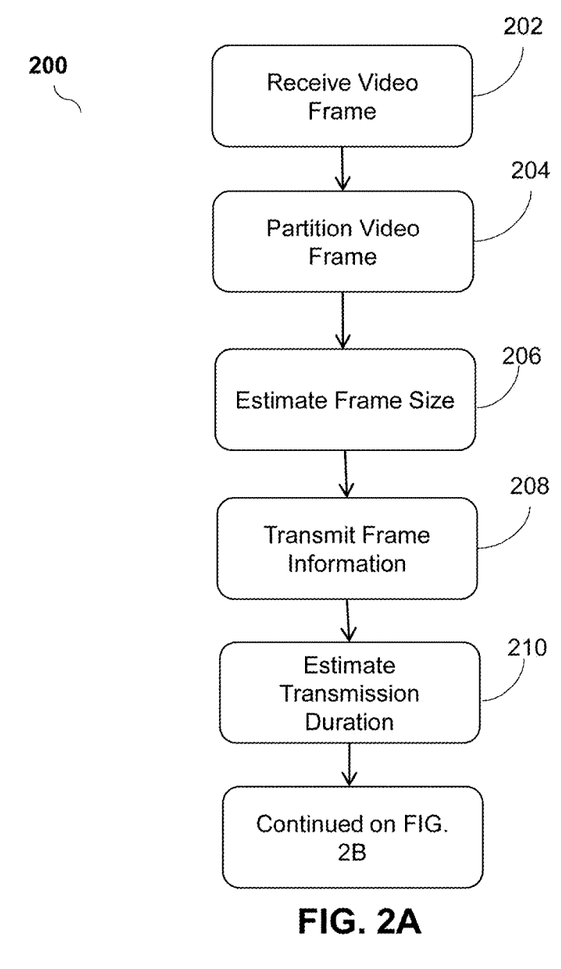
FIGS. 2A-2C include a flow chart illustrating a process or method for reducing latency and/or jitter, according to an example implementation of the present disclosure.
Figure 2B:
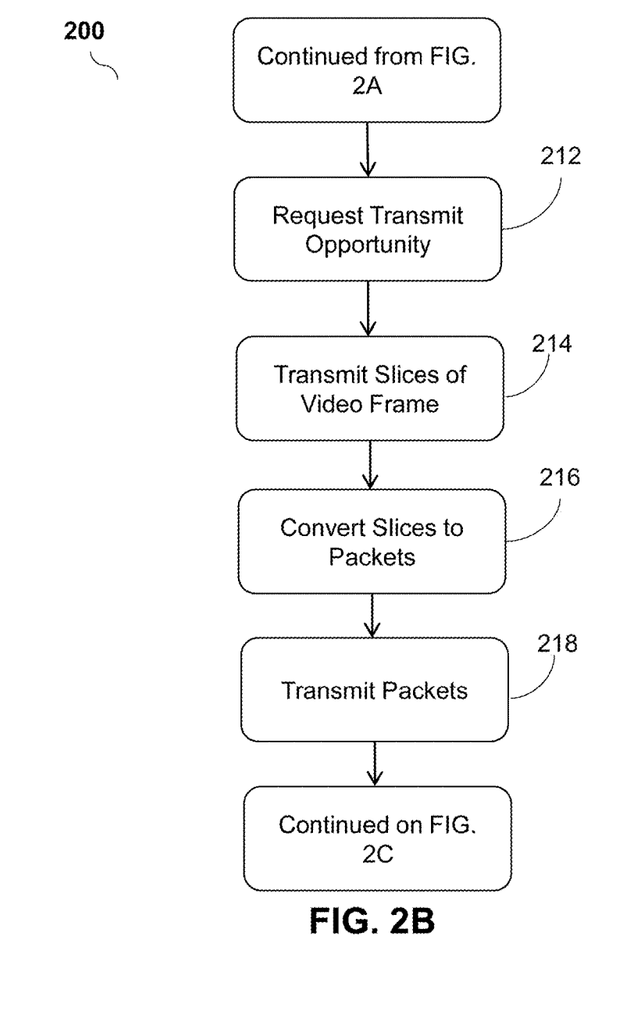
Figure 2C:
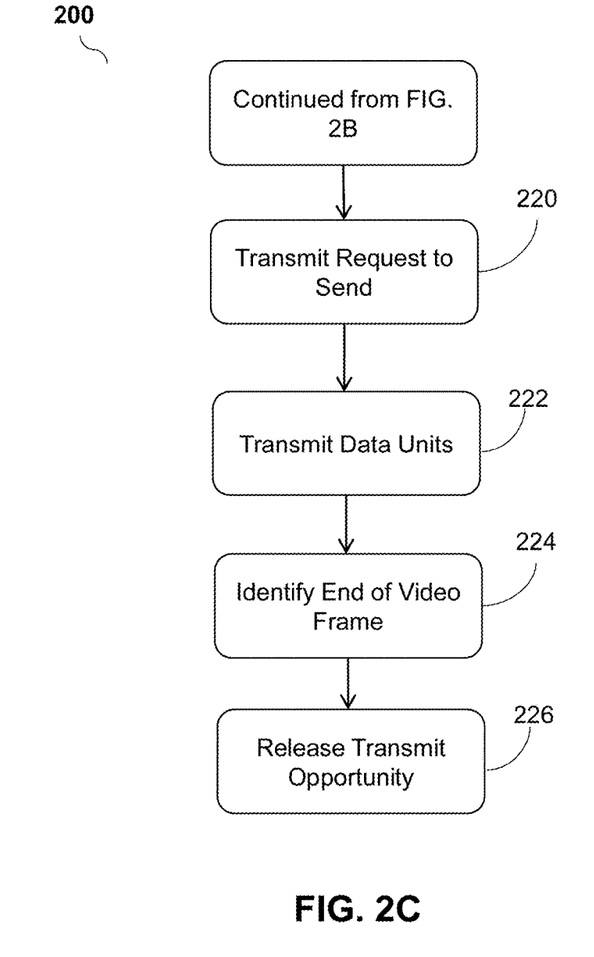

Now referring to FIG. 1B, an example embodiment of the device 102 is provided to illustrate the communication and operations of the components of device 102 in executing method 200 of FIGS. 2A-2C. For example, in FIG. 1B, the components of the device 102, the VR application 120, the device driver 122 and the firmware 124 are illustrated with reference numerals corresponding to the steps of method 200 to show an example order of processing a video frame 130 between the different components and transmitting the video frame 130 to a receiving device 180, for example, to stream the video frame at the receiving device 180.

In some embodiments, the VR application 120 can estimate project or determine a size of the video frame 130 (e.g., after compression and/or processing into protocol data units for instance) based in part on a compressed size of a slice 132 of the video frame 130 (e.g., 206 of method 200). The VR application 120 can transmit frame information 134 including the estimated size to the device driver 122 of the device 102 through a connection 150 (e.g., 208 of method 200). The device driver 122 can receive the frame information 134 and estimate a transmission duration 142 (e.g., 210 of method 200) for protocol data units of the video frame for instance. The device driver 122 can request a transmit opportunity 140 or transmit an instruction corresponding to a transmit opportunity 140 to the firmware 124 of the device through a connection 150 (e.g., 212 of method 200). The transmit opportunity 140 can include or indicate the transmission duration 142. For example, a transmit opportunity 140 can include a time period, time range or amount of time a device 102 (e.g., station) can transmit one or more frames 130, one or more slices 132, one or more packets 164 and/or one or more data units 172 when the respective device 102 has been given or provided contention for a transmission medium (e.g., wireless medium), such as but not limited to, a transmission medium between the device 102 and a receiving device 180. The VR application 120 can transmit a plurality of slices 132 of the video frame 130 to the device driver 122 through a connection 150 (e.g., 214 of method 200). The device driver 122 can receive the slices 132, convert the slices 132 to packets 164 and transmit the plurality of packets 164 to the firmware 124 device driver 122 through a connection 150 (e.g., 218 of method 200).

The firmware 124 can transmit a request to send (RTS) 176 with or for the transmit opportunity 140 and the transmission duration 142 to at least one receiving device through at least one transmission channel 150 (e.g., 220 of method 200). The firmware 124 and/or the receiving device 180 can reserve the transmission channel 150 for the transmission duration 142. The firmware 124 can aggregate the packets 164 from the device driver 122 to generate one or more data units 172 and transmit the data units 172 to the receiving device 180 within the transmit opportunity 140 and through the reserved channel 150 (e.g., 222 of method 200). The device driver 122 can mark or indicate an end of the video frame 130 by inserting an end frame 166 into the video frame 130. For example, the device driver 122 can insert the end frame 166 after a last or final packet 164 of the video frame 130 and transmit the end frame 166 to the firmware 124 to indicate the end of the video frame 130 (e.g., 224 of method 200). The firmware 124 can receive the end frame 166 and determine that the transmission of the video frame 130 to the receiving device 108 is complete. The firmware 124 can generate a control frame 174 and transmit the control frame 174 to the receiving device 180 to release the transmit opportunity 140 or otherwise end the transmit opportunity 140 between the device 102 and the receiving device 180 (e.g., 226 of method 200). It should be appreciated that FIG. 1B shows an example embodiment of an order of processing a video frame 130 by components of device 102 and that one or more of the steps, operations or techniques of method 200 can be performed in a different order from FIG. 1B.

Now referring to FIGS. 2A-2C, a method 200 for reducing latency and/or jitter by reserving a transmission duration for a transmit opportunity is depicted. In brief overview, the method 200 can include one or more of: receiving a video frame (202), partitioning the video frame (204), estimating a frame size (206), transmitting frame information (208), estimating transmission duration (210), requesting a transmit opportunity (212), transmitting slices of a video frame (214), converting slices to packets (216), transmitting packets (218), transmitting a request to send (220), transmitting data units (222), identifying an end of the video frame (224), and releasing the transmit opportunity (226). Any of the foregoing operations may be performed by any one or more of the components or devices described herein, for example, the device 102, processor(s) 104, VR application 120, device driver 122, or firmware 124.

Referring to 202, and in some embodiments, a video frame can be received. One or more video frames 130 can be received at a device 102, such as but not limited to a WiFi device. For example, the device 102 can include or correspond to a transmit device for a video streaming system and can receive one more video frames 130 to provide (e.g., stream) to one or more receiving devices 180. In some embodiments, the device 102 can process the video frame 130 for providing or streaming to one or more receiving devices 180 or applications executing one or more receiving devices 180.

Referring to 204, and in some embodiments, the video frame can be partitioned. The device 102 or VR application 120 can partition the video frame 130 into a plurality of slices 132. The device 102 or VR application 120 can partition the video frame 130 into equal slices 132. For example, each of the slices 132 can be the same size, or the same length in terms of transmission time (after compression and/or processing) for instance. In some embodiments, the device 102 can partition the video frame 130 into one or more different sized slices 132. For example, one or more of the slices 132 can have a different size or different transmission time length (e.g., after compression and/or processing) as compared to one or more other slices 132 of the video frame 130. The slices 132 can correspond to individual segments or individual portions of the video frame 130. The number of slices 132 of the video frame 130 can vary and can be based at least in part on an overall size or overall length of the video frame 130.

In some embodiments, the device 102 or VR application 120 can compress a first slice 132 or each of the plurality of slices 132 of the video frame 130 to obtain a size of the first slice 132 after compression (e.g., compressed size) or a compressed size of each slice 132 of the plurality of slices 132 after compression. For example, the device 102 or VR application 120 can compress the plurality of slices 132 of the video frame 130 to reduce a size of each slice 132 from a first size or first length to a second size or second length that is smaller or less than the first size or length. In some embodiments, the device 102 or VR application can apply a compression algorithm (e.g., lossless compression algorithm, lossy compression algorithm) to reduce the size of the slices 132. The device 102 or VR application 120 can compress the plurality of slices 132 of the video frame 130 to reduce the amount of memory to be used to store or process the slices 132 and transmit the slices 132.

Referring to 206, and in some embodiments, the frame size can be estimated or determined. The device 102 can estimate a size (e.g., total size) of the video frame 130 (e.g., after compression) according to or using a size of a first slice 132 after compression of a plurality of slices 132 after compression of the video frame 130. In some embodiments, the VR application 120 executing on the device 102 can estimate a compressed frame size of at least one slice 132 (e.g., first slice) of the video frame 130 using one or more properties of the slice 132 and/or the video frame 130. For example, the VR application 120 can estimate the size of the slice 132 based in part on the number of slices 132 forming the video frame 130, a frame rate, a bit rate, a total size and/or a type of the video frame 130, and/or a time length or time value of the respective slice 132. In some embodiments, if each of the slices 132 are the same size, the VR application 120 can determine the compressed size of each slice 132 using the total or overall size of the compressed video frame 130 and the total number of slices 132. The determined compressed frame size of the slice 132 can include a time length/duration value, a memory size value, or a bit value (e.g., number of bits or bytes).

In some embodiments, the device 102 or VR application 120 can insert a marker frame 136 in the video frame 130, for example prior to a first slice 132, to indicate the overall size of the video frame 130. The VR application 120 can generate a marker frame 136 to include properties of the video frame 130 and/or metadata corresponding to the video frame 130. In some embodiments, the properties of the video frame 130 can include, but not limited to, a compressed size of at least one slice 132, a total number of slices 132 forming the video frame 130, and/or the size or length of the video frame 130. The VR application 120 can insert or add the marker frame 136 to the video frame 130, for example, before or prior to the first slice 132 of the plurality of slices 132 forming the video frame 130. In some embodiments, the VR application 120 can transmit or provide the marker frame 136 to a device driver 122 of the device 102 prior to or before transmitting the first slice 132 of the video frame 130 to the device driver 122.

Referring to 208, and in some embodiments, frame information can be transmitted. The device 102 or VR application 120 can transmit the frame information or data 134 for the video frame 130 to a device driver 122 of the device 102. In some embodiments, the frame information 134 can include the marker frame 136. For example, the VR application 120 can transmit the frame information 134 to the device driver 122 through at least one connection 150 between the VR application 120 and the device driver 122 and the frame information 134 can include the estimated size of the video frame 130 after compression. The VR application 120 can transmit the frame information 134 prior to transmitting the slices 132 of the video frame 130 or with (e.g., same time, concurrently) the slices 132 of the video frame 130. For example, the frame information 134 having the marker frame 136 can be transmitted to the device driver separately and prior to the first slice 132 of the video frame 130. In some embodiments, the frame information 134 having the marker frame 136 can be inserted in or included within a header portion of the video frame 130 and prior to the first slice 132 of the video frame 130 and the VR application 120 can transmit the header portion to the device driver 122 before transmitting the slices 132 to provide properties and data corresponding to the video frame 130 to the device driver 122. The VR application 120 can transmit the frame information 134 with the plurality of slices 132 of the video frame 130 to the device driver 122 through at least one connection 150 between the VR application 120 and the device driver 122.

Referring to 210, and in some embodiments, a transmission duration can be estimated. The device 102 or the device driver 122 can estimate the transmission duration 142 according to the frame information 134. The device 102 or the device driver 122 can estimate the transmission duration 142 for (or associated with) the video frame 130 (e.g., to transmit data units 172 corresponding to the video frame 130) according the frame information 134. For example, the device driver 122 can estimate the transmission duration 142 to transmit data unit(s) 172 corresponding to one or more packets 164 and one or more slices 132 of the video frame 130, according to the size of the video frame 130 after compression, the total number of slices 132 of the plurality of slices 132, the compressed size of a slice 132 and/or properties of a connection 150 between the device 102 and one or more receiving devices 180. The device driver 122 can receive the frame information 134 having the marker frame 136, and can extract or identify the size of the video frame 130, the total number of slices 132 of the plurality of slices 132, and/or the compressed size of a slice 132. The device driver 122 can determine one or more properties of the connection 150 between the device 102 and one or more receiving devices 180. For example, the device driver 122 can determine properties (e.g., conditions, parameters, limitations) including, but not limited to, a quality of the connection 150 (e.g., channel), a data rate (e.g., data transfer rate, bit rate) of the connection 150, and/or a bandwidth of the connection 150. The device driver 122 can estimate the transmission duration 142 that indicates a time value, time period or time range to transmit each of the data units 172 corresponding to the plurality of slices 132 of the video frame from the device 102 (e.g., via the firmware 124) to at least one receiving device 180 through at least one connection 150 using the size of the video frame 130, the total number of slices 132, the compressed size of a slice 132 and/or the properties of the connection 150. In some embodiments, the device driver 122 can generate an instruction to indicate the estimated transmission duration 142 for a firmware 124 of the device 102. In some embodiments, the device driver 122 can, according to the frame information 134, generate an instruction to cause a firmware 124 of the device 102 to generate the RTS 176.

Referring to 212, and in some embodiments, a transmit opportunity can be requested. The device 102 or device driver 122 can generate an instruction or request for a transmit opportunity 140 for the video frame 130. The transmit opportunity 140 can include or support the transmission duration 142 corresponding to or associated with the size of the video frame 130 (e.g., after compression and/or processing for transmission). In some embodiments, the instruction for the transmit opportunity 140 can include a minimum transmission time, a maximum transmission time or a time range corresponding to the time period between the minimum transmission time and the maximum transmission time. In some embodiments, the estimated transmission duration 142 can be a value between the minimum transmit time and the maximum transmit time. The device driver 122 can transmit the instruction for the transmit opportunity 140 to the firmware 124 through at least one connection 150 between the device driver 122 and the firmware 124.

In some embodiments, the device driver 122, upon receiving the marker frame 136, can translate, process or convert the marker frame 136 into a vendor specific command 162 (e.g., instruction specific to manufacturer of transmitting device 102, instruction specific to manufacturer of firmware 124) for the firmware 124 of the device 102. For example, the device driver 122 can generate the vendor specific command 162 from the marker frame 136 and the vendor specific command 162 can force, instruct, or command the firmware 124 to force or generate an expected duration (e.g., transmission duration 142) for a next or subsequent request to send (RTS) to be equal to, same as or correspond to the transmission duration 142. In some embodiments, the device driver 122 can transmit the vendor specific command to the firmware 124 with the instruction for the transmit opportunity 140. In some embodiments, the device driver 122 can generate the vendor specific command 162 to force, instruct, or command the firmware 124 to force or cause a new or subsequent data unit (e.g., a aggregated MAC protocol data unit (AMPDU)) to be initiated or started with a next, following or subsequent packet 164. The firmware can combine, convert, translate and/or process one or more packets from the device driver 122 to form one data unit (e.g., AMPDU) for transmission to the receiving device.

Referring to 214, and in some embodiments, slices of the video frame can be transmitted. The VR application 120 can transmit the plurality of slices 132 of the video frame 130 to the device driver 122 through at least one connection 150 between the VR application 120 and the device driver 122. In some embodiments, the VR application 120 can begin or initiate transmitting the plurality of slices 132 of the video frame 130 responsive to or after the device driver 122 transmits the instruction (e.g., request) for the transmit opportunity 140 to the firmware 124. For example, the VR application 120 can determine that the instruction for the transmit opportunity 140 to the firmware 124 has been transmitted to the firmware 124 and the VR application 120 can begin or initiate transmitting each of the slices 132 of the video frame 130 to the device driver 122.

Referring to 216, and in some embodiments, the slices can be processed into packets. The device 102 or the device driver 122 can process or convert the plurality of slices 132 of the video frame 130 into a plurality of packets 164. For example, the device driver 122 can convert the slices 132 into packets 164 such as but not limited to, a protocol data unit or a MAC protocol data unit (MPDU). The device driver 122 can generate the packets 164 having the same size or length. In some embodiments, the device driver 122 can generate one or more packets 164 having a different size or length from one or more other packets 164. The device driver 122 can convert a single slice 132 into a single packet 164 or multiple packets 164 (e.g., two or more packets 164). In some embodiments, the device driver 122 can convert multiple slices 132 into a single packet 164.

Referring to 218, and in some embodiments, the packets can be transmitted. The device driver 122 can transmit the plurality of packets 164 corresponding to the video frame 130 to a firmware 124 of the device 102. Each of the packets 164 can include one slice 132 or multiple slices 132 of the plurality of slices 132. The device driver 122 can transmit the packets 164 based in part on an order or arrangement of the slices 132 within the video frame 130. For example, the device driver can transmit the packets 164 based in part on a position or location within the video frame 130 or based in part on a position or location of a slice 132 or multiple slices 132 forming the respective packet 164 within the video frame 130.

Referring to 220, and in some embodiments, a request to send (RTS) can be transmitted. The device 102 or the firmware 124 can generate a request to send (RTS) 176 to reserve, for the transmission duration 142 corresponding to the size of the video frame 130 after compression, a transmission channel 150 (e.g., connection) to transmit the data units 172 corresponding to the plurality of slices 132 of the video frame 130. In some embodiments, the firmware 124 can generate the RTS 176 to include the instruction for the transmit opportunity 140, the transmission duration 142, the frame information 134 and/or the size of the video frame 130. The device 102 or the firmware 124 can broadcast or transmit the RTS 176 to one or more receiving devices 180. The RTS 176 can be transmitted to a receiving device 180 with the requested transmit opportunity 140 to reserve the transmission channel 150 for the transmission duration 142 to transmit the plurality of data units 172 associated with the video frame 130. The RTS 176 can cause or result in the transmission channel 150 between the device 102 and the receiving device 180 being reserved for the transmission duration 142. For example, the RTS 176 can include or correspond to a command or instruction transmitted from device 102 to the receiving device 180 indicating that the device 102, through the firmware 124, is going to transmit a plurality of data units 172 such as AMPDUs (e.g., formed from the slices 132 and/or packets 164) to the receiving device 180. The RTS 176 can instruct the receiving device 180 to reserve at least one transmission channel 150 between the device 102 and the receiving device 180 for a length of time equal to or corresponding to the transmission duration 142. The receiving device 180 can, responsive to receiving the RTS 176, reserve the transmission channel 150 between the device 102 and the receiving device 180 for the transmission duration 142. In some embodiments, the transmit opportunity 140 to transmit the plurality of data units 172 between the device 102 and the receiving device 180 can be released, completed or finished within the transmission duration 142.

Referring to 222, and in some embodiments, data units can be transmitted. In some embodiments, the device 102 or firmware 124 can convert or treat each packet 164 received from the device driver 122 as a data unit 172, such as but not limited to as MAC protocol data unit. For example, each packet 164 received can be converted or treated as at least one data unit 172. In some embodiments, the device 102 or the firmware 124 can aggregate or combine the plurality of packets 164 corresponding to the plurality of slices 132 into a determined number of protocol data units 172 for transmission to the receiving device 180 through the transmission channel 150 during the transmission duration 142. For example, the firmware 124 can aggregate or combine multiple packets 164 to form one or more aggregated MAC protocol data units 172 (e.g., AMPDU). The device 102 or the firmware 124 can transmit the one or more data units 172 to the receiving device 180 responsive to the receiving device 180 receiving the RTS 176, the receiving device 180 reserving the transmission channel 150 or responsive to receiving a response from the receiving device 180 that the RTS 176 was received. The firmware 124 can transmit the data units 172 in an order corresponding to the order, position or location within the video frame 130 of a slice 132 or multiple slices 132 corresponding to the respective data unit 172. In embodiments, the firmware 124 can transmit the data units 172 having a particular inter frame spacing, which can be based at least in part on an industry standard, vendor request, third party request and/or a desired inter frame spacing. For example, the firmware 124 can transmit the data units 172 in multiple frame bursts during a transmit opportunity 140 such that the inter frame spacing of the data units 172 for one or more of the frame bursts is less than a short inter frame space (SIFS) and/or equal to the SIFS. In embodiments, the firmware 124 can select a particular inter frame spacing for the transmit opportunity 140 that is greater than a SIFS. For example, the device 102 or firmware 124 can request or transmit the data units 172 in multiple frame bursts such that the inter frame spacing (IFS) of the data units 172 between one or more frame bursts is greater than a SIFS.

In some embodiments, during the transmit opportunity 140, the device 102 via the firmware 124 can transmit other frames to the receiving device 180. For example, remote desktop protocol (RDP) can be implemented in the transmission channel 150 between the device 102 and the receiving device 180. The device 102 and the receiving device 180 can transmit, exchange or share frames corresponding to or including data other than video data. The device 102 and the receiving device 180 can transmit, exchange or share the other forms of data during the transmit opportunity and while the transmission channel 150 is reserved between the device 102 and the receiving device 180.

Referring to 224, and in some embodiments, an end of the video frame can be identified. In some embodiments, the device 102 or firmware 124 can determine, during the transmission duration 142 of the transmit opportunity 140, that the transmission of data units 172 corresponding to the plurality of slices 132 of the video frame 130 to the receiving device 180 is complete prior to an end of the transmission duration 142 or before the transmission duration 142 expires. For example, the device 102 or device driver 122 can insert or add one or more end frames (e.g., marker frames) into the video frame 130 to indicate an end or last portion of the respective video frame 130. The device driver 122 can insert an end frame after a last slice 132, packet 164 or data unit 172 of the video frame 130. In some embodiments, the device driver 122 can transmit the end frame after transmitting a last or final slice 132, packet 164 or data unit 172 of the video frame 130. The firmware 124 can detect the end frame during or after transmission of the data units 172 and generate an indication or alert for the device 102 that the transmission of the data units 172 is complete. In some embodiments, the device 102 or firmware 124 can identify a last or final data unit 172 corresponding to the video frame 130 and generate an indication or alert for the device 102 that the transmission of the data units 172 is near complete. The device 102 can compare a time to transmit the data units 172 to the receiving device 108 to the transmission duration 142 and determine that the time to transmit the data units 172 is less than the transmission duration 142. In some embodiments, the firmware 124 can maintain a clock or time value during the transmission of the data units 172 and compare the time value to the transmission duration 142 after detecting the end frame to determine that the transmission of the video frame 130 is complete before or prior to the end of the transmission duration 142.

Referring to 226, and in some embodiments, the transmit opportunity can be released. The device 102 or the firmware 124 can generate a control frame 174 for the receiving device 180 to release the transmit opportunity 140 through the transmission channel 150 prior to the end of the transmission duration 142. For example, responsive to determining the transmission of the data units 172 is complete, the device 102 can generate the control frame 174. The control frame 174 can include an instruction or command to release or end the transmit opportunity 140 between the device 102 and the receiving device 180. The device 102 or firmware 124 can transmit the control frame 174 to the receiving device 180 to release the transmit opportunity 140 through the transmission channel 150 prior to the end of the transmission duration 142. In some embodiments, the transmit opportunity can be released or ended responsive to the receiving device 180 receiving the control frame 174 by the device 102, the receiving device 180 or both the device 102 and the receiving device 180. In some embodiments, the device 102 or the firmware 124 can generate the control frame 174 responsive to the last data unit 172 being transmitted and/or the end of the transmission duration 142 of the transmit opportunity 140. For example, the device 102 can determine that the last data unit 172 has been transmitted to the receiving device 180 and that the transmission duration 142 is complete. The transmit opportunity can be released (e.g., automatically) or ended responsive to the end of the transmission duration 142 by the device 102, the receiving device 180 or both the device 102 and the receiving device 180.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
compressing, by a device, a first slice of a plurality of slices of a video frame to obtain a size of the first slice after compression;
estimating, by the device, a size of the video frame after compression, according to the size of the compressed first slice;
generating, by a device driver of the device prior to compressing the plurality of slices of the video frame and after compressing the first slice, a request to send (RTS) to reserve a transmission channel for a transmission duration according to the estimated size of the video frame after compression; and
broadcasting, by the device driver, the RTS to one or more other devices.

2. The method of claim 1, further comprising:
transmitting, by a virtual reality application of the device, frame information to the device driver of the device, the frame information comprising the estimated size of the video frame after compression.

3. The method of claim 2, further comprising:
estimating, by the device driver, the transmission duration according to the frame information; and
generating, by the device driver according to the frame information, an instruction to cause a firmware of the device to generate the RTS.

4. The method of claim 1, further comprising:
transmitting, by a virtual reality application of the device, the plurality of slices of the video frame to the device driver of the device.

5. The method of claim 4, further comprising:
processing, by the device driver, the plurality of slices of the video frame into a plurality of packets.

6. The method of claim 5, further comprising:
transmitting, by the device driver, the plurality of packets to a firmware of the device.

7. The method of claim 1, comprising:
aggregating, by a firmware of the device, a plurality of packets corresponding to the plurality of slices into a determined number of protocol data units for transmission to a receiving device via the transmission channel.

8. The method of claim 1, further comprising:
determining, by the device, that a transmission for the video frame to a receiving device is complete prior to an end of the transmission duration.

9. The method of claim 8, comprising:
transmitting, by the device in response to the determining, a control frame to the receiving device to release the transmission channel prior to the end of the transmission duration.

10. A device comprising:
one or more processors configured to:
compress a first slice of a plurality of slices of a video frame to obtain a size of the first slice after compression;
estimate a size of the video frame after compression, according to the size of the compressed first slice;
generate, by a device driver executing on the one or more processors prior to compressing the plurality of slices of the video frame and after compressing the first slice, a request to send (RTS) to reserve a transmission channel for a transmission duration according to the estimated size of the video frame after compression; and
broadcast, by the device driver, the RTS to one or more other devices.

11. The device of claim 10, wherein the device includes a virtual reality application, the device driver and a firmware.

12. The device of claim 10, further comprising a virtual reality application executing on the one or more processors, the virtual reality application configured to transmit frame information to the device driver, the frame information comprising the estimated size of the video frame after compression.

13. The device of claim 12, further comprising the device driver, the device driver configured to:
estimate the transmission duration according to the frame information; and
generate an instruction to cause a firmware of the device to generate the RTS.

14. The device of claim 10, further comprising the device driver configured to process the plurality of slices of the video frame into a plurality of packets.

15. The device of claim 14, wherein the device driver is further configured to transmit the plurality of packets to a firmware of the device.

16. The device of claim 10, further comprising a firmware executing on the one or more processors, the firmware configured to aggregate a plurality of packets corresponding to the plurality of slices into a determined number of protocol data units for transmission to a receiving device via the transmission channel.

17. The device of claim 10, wherein the one or more processors are further configured to determine that a transmission for the video frame to a receiving device is complete prior to an end of the transmission duration.

18. The device of claim 17, wherein the one or more processors are further configured to:
transmit a control frame to the receiving device to release the transmission channel prior to the end of the transmission duration, in response to the determination.

19. A non-transitory computer readable medium storing instructions when executed by one or more processors cause the one or more processors to:
compress a first slice of a plurality of slices of a video frame to obtain a size of the first slice after compression;
estimate a size of the video frame after compression, according to the size of the compressed first slice;
generate, by a device driver executing on the one or more processors prior to compressing the plurality of slices of the video frame and after compressing the first slice, a request to send (RTS) to reserve a transmission channel for a transmission duration according to the estimated size of the video frame after compression; and
broadcast, by a device driver, the RTS to one or more other devices.

20. The non-transitory computer readable medium of claim 19, further comprising instructions when executed by the one or more processors further cause the one or more processors to:
determine that a transmission for the video frame to a receiving device is complete prior to an end of the transmission duration; and
transmit a control frame to the receiving device to release the transmission channel prior to the end of the transmission duration, in response to the determination.

* * * * *